United States Patent
Ostrowski et al.

(10) Patent No.: US 12,034,281 B2
(45) Date of Patent: Jul. 9, 2024

(54) FAULT DETECTION SYSTEM

(71) Applicant: ABB Schweiz AG, Baden (CH)

(72) Inventors: Joerg Ostrowski, Zürich (CH); Kai Hencken, Lörrach (DE); Ralf Gitzel, Mannheim (DE); Joerg Gebhardt, Mainz (DE); Oliver Becker, Schriesheim (DE); Maciej Mruczek, Cracow (PL); Tomas Kozel, Brno (CZ); Anastasios Papageorgiou, Zürich (CH)

(73) Assignee: ABB Schweiz AG, Baden (CH)

( * ) Notice: Subject to any disclaimer, the term of this patent is extended or adjusted under 35 U.S.C. 154(b) by 267 days.

(21) Appl. No.: 17/720,756

(22) Filed: Apr. 14, 2022

(65) Prior Publication Data

US 2022/0337037 A1 Oct. 20, 2022

(30) Foreign Application Priority Data

Apr. 14, 2021 (EP) ..................................... 21168315

(51) Int. Cl.
*H02B 13/065* (2006.01)
*G01J 5/00* (2022.01)

(52) U.S. Cl.
CPC .......... *H02B 13/065* (2013.01); *G01J 5/0096* (2013.01)

(58) Field of Classification Search
CPC ........ H02B 13/065; G01K 3/08; G01K 7/427; G01K 2003/145; G01J 5/0096

(Continued)

(56) References Cited

U.S. PATENT DOCUMENTS

2001/0035825 A1* 11/2001 Messmer ................ F23N 5/242
 374/E3.007
2005/0209813 A1* 9/2005 Kautz .................... G01K 7/427
 374/E7.042

(Continued)

FOREIGN PATENT DOCUMENTS

CN 102788645 A 11/2012
CN 103226731 A 7/2013

(Continued)

OTHER PUBLICATIONS

European Patent Office, Extended European Search Report in European Application No. 21168315.6, 7 pp. (Oct. 15, 2021).

*Primary Examiner* — Kevin J Comber
(74) *Attorney, Agent, or Firm* — Leydig, Voit & Mayer, Ltd.

(57) ABSTRACT

A fault detection system and method includes a sensor; a processing unit; and an output unit. The sensor is configured to acquire temperature data at a sensor location of a device, wherein the temperature data comprises first temperature data and second temperature data acquired a first time period after the first temperature data. The processing unit determines a temperature magnitude comprising utilization of the first temperature data and/or the second temperature data, and determines a rate of change of temperature. The processing unit predicts a temperature at a location of the device using the temperature magnitude, the rate of change of temperature, and a correlation, wherein the correlation is a correlation of a plurality of temperature magnitudes and a plurality of rate of change of temperatures at the sensor location with a plurality of hotspot temperatures at the location.

15 Claims, 2 Drawing Sheets

Figure 1:
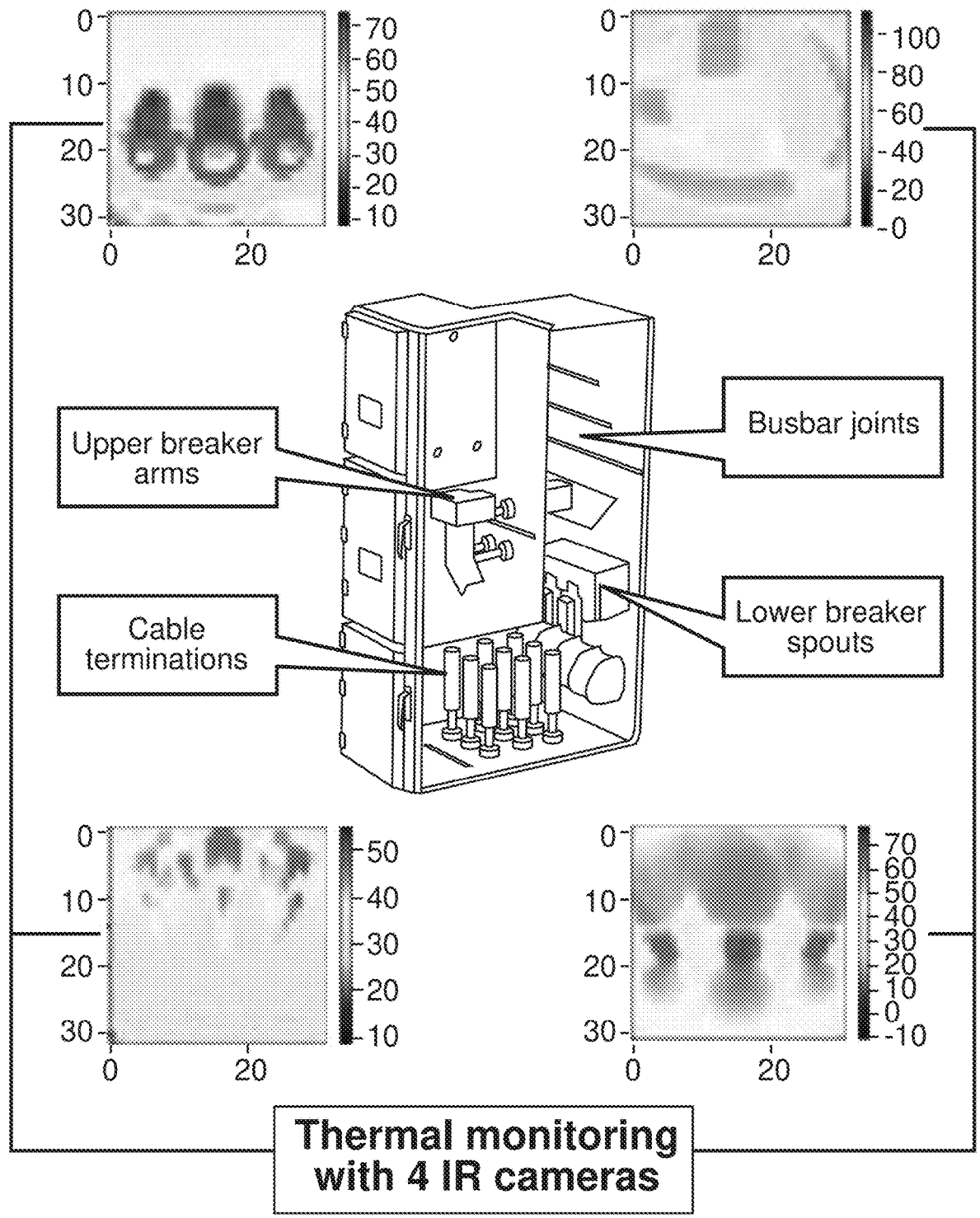

(58) Field of Classification Search
USPC .......................................................... 361/115
See application file for complete search history.

(56) References Cited

U.S. PATENT DOCUMENTS

| | | | |
|---|---|---|---|
| 2016/0218600 A1* | 7/2016 | Sugimoto | ............... H02P 29/64 |
| 2018/0336494 A1 | 11/2018 | Wagstaff | |
| 2020/0166825 A1* | 5/2020 | Iwasaki | .................. G02B 7/282 |

FOREIGN PATENT DOCUMENTS

| | | | |
|---|---|---|---|
| CN | 204461610 U | | 7/2015 |
| CN | 204461613 U | | 7/2015 |
| CN | 105869408 A | | 8/2016 |
| CN | 106979820 A | | 7/2017 |
| CN | 109256747 A | | 1/2019 |
| EP | 3671997 A1 | * | 6/2000 |
| EP | 3671997 A1 | | 6/2020 |
| WO | WO 2018/200541 A1 | | 11/2018 |

\* cited by examiner

FAULT DETECTION SYSTEM

CROSS-REFERENCE TO RELATED APPLICATIONS

This patent application claims priority to European Patent Application No. 21168315.6, filed on Apr. 14, 2021, which is incorporated herein in its entirety by reference.

FIELD OF THE DISCLOSURE

The present disclosure relates to a fault detection system and to a fault detection method.

BACKGROUND OF THE INVENTION

The temperature of a device (e.g. Medium Voltage MV Switchgear or motor) often needs to stay within device specific limits to avoid damage from thermal stress. Temperature measurements (e.g. with IR sensors, thermocouple sensors, SAW or RFID sensors) are used to control that these limits are kept. The measurement gives only information about the status of the temperature at the moment of the measurement and at the position of the measurement.

However, situations can arise, where damage occurs. For example, there can be a situation where a service task for a MV switchgear has been completed, and the device is put back into operation. The device then starts to heat up from the temperature of the environment when the power is switched on. If a mistake happened during the maintenance task, e.g. a screw that closes an electrical contact was forgotten to be fully tightened, then the contact resistance can be so high (and consequently the electrical losses high) that the device will overheat after some time. The highest temperature at the hotspot of the device is reached in the stationary state. It is desired to detect such faults that will lead to overheating before the critical temperature is reached. The hotspot is usually close to the fault, i.e. near to the lose screw and might be invisible for to the IR cameras or be at a position where thermocouples or other sensors cannot easily be attached to the device.

BRIEF SUMMARY OF THE INVENTION

The present disclosure provides an improved system for detecting a fault in a device such as a switchgear or motor before that fault leads to an unwanted temperature rise that can for example damage the device.

The object of the present invention is solved with the subject matter of the independent claims, wherein further embodiments are incorporated in the dependent claims.

In an aspect, there is provided a fault detection system, comprising:
  a sensor;
  a processing unit; and
  an output unit.

The sensor is configured to acquire temperature data at a sensor location of a device. The temperature data comprises first temperature data and second temperature data acquired a first time period after the first temperature data. The processing unit is configured to determine a temperature magnitude comprising utilization of the first temperature data and/or the second temperature data. The processing unit is configured to determine a rate of change of temperature comprising utilization of the first temperature data and the second temperature data and the first time period. The processing unit is configured to predict a temperature at a location of the device comprising utilization of: the temperature magnitude; the rate of change of temperature; and a correlation. The correlation is a correlation of a plurality of temperature magnitudes and a plurality of rate of change of temperatures at the sensor location with a plurality of hotspot temperatures at the location. The processing unit is configured to determine if the device has a fault comprising utilization of the predicted temperature. The output unit is configured to output an indication that the device has a fault.

BRIEF DESCRIPTION OF THE SEVERAL VIEWS OF THE DRAWING(S)

Figure 2:
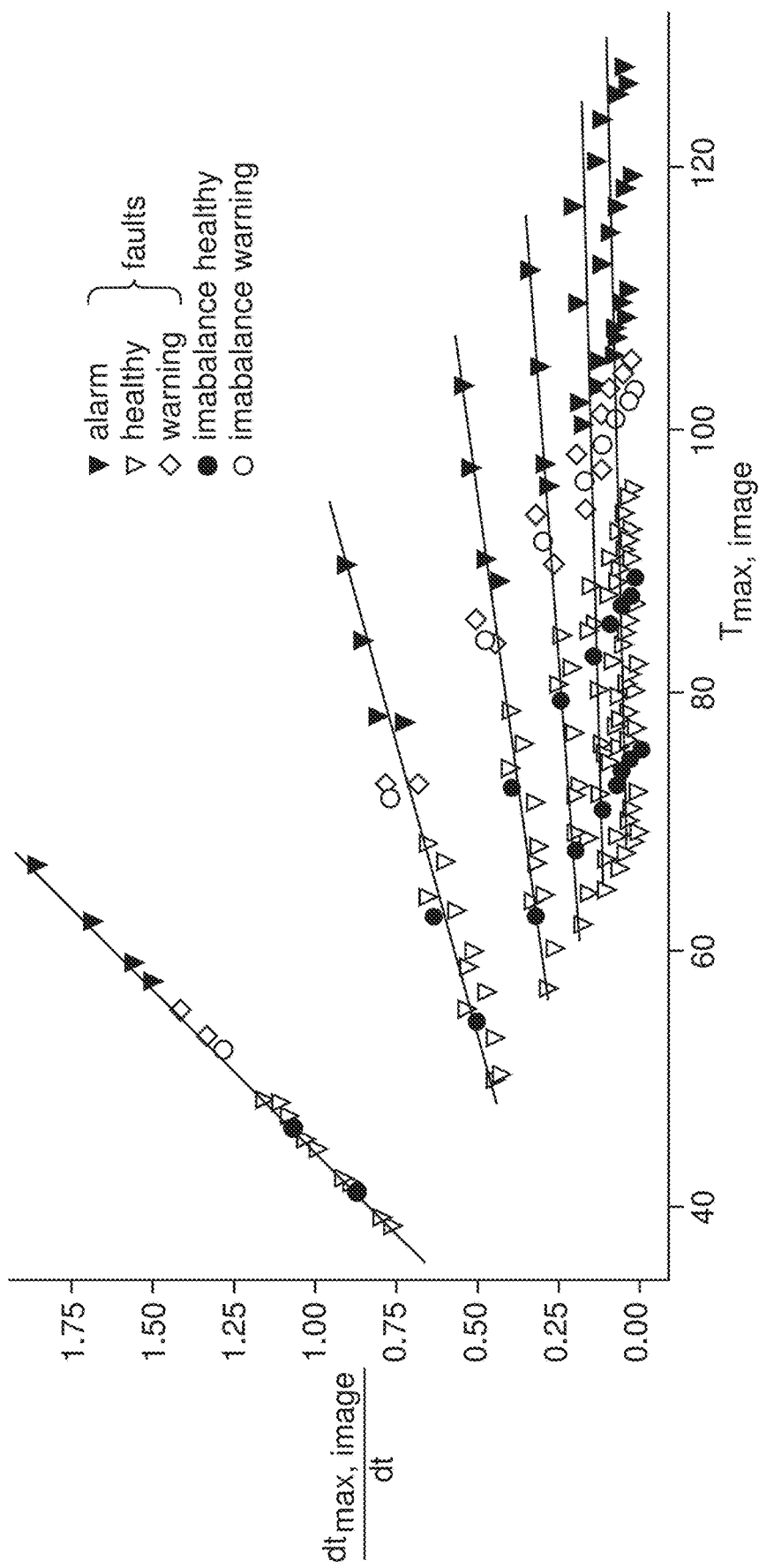

Exemplary embodiments will be described in the following with reference to the following drawings:

FIG. 1 shows a schematic representation of an example of a fault detection system in accordance with the disclosure; and FIG. 2 shows a representation of a series of correlations in accordance with the disclosure.

DETAILED DESCRIPTION OF THE INVENTION

Embodiments in accordance with the present disclosure include an improved system for detecting a fault in a device such as a switchgear or motor before that fault leads to an unwanted temperature rise that can for example damage the device.

The object of the present invention is solved with the subject matter of the independent claims, wherein further embodiments are incorporated in the dependent claims.

In an aspect, there is provided a fault detection system, comprising:
  a sensor;
  a processing unit; and
  an output unit.

The sensor is configured to acquire temperature data at a sensor location of a device. The temperature data comprises first temperature data and second temperature data acquired a first time period after the first temperature data. The processing unit is configured to determine a temperature magnitude comprising utilization of the first temperature data and/or the second temperature data. The processing unit is configured to determine a rate of change of temperature comprising utilization of the first temperature data and the second temperature data and the first time period. The processing unit is configured to predict a temperature at a location of the device comprising utilization of: the temperature magnitude; the rate of change of temperature; and a correlation. The correlation is a correlation of a plurality of temperature magnitudes and a plurality of rate of change of temperatures at the sensor location with a plurality of hotspot temperatures at the location. The processing unit is configured to determine if the device has a fault comprising utilization of the predicted temperature. The output unit is configured to output an indication that the device has a fault.

In this manner, early detection of a part of a device such as a part of a switchgear or motor that has a fault, such as a loose connection, that will lead to overheating is provided before the device overheats.

In other words, the system detects faults and avoids overheating by using measurements of the temperature and the temperature rise rate in combination with their correlation to the hotspot temperature. This enables the early detection of future overheating of a device, a significant time before overheating occurs, and thus can be used to avoid this overheating.

In is to be noted that a "fault" being detected can be a detection of fault such as a loose connection determined from temperatures or could be detection of a hotspot as such.

In an example, the processing unit is configured to determine if the device has a fault comprising a determination that the predicted temperature exceeds a threshold temperature. Thus, the processing unit can be implemented in the form or a programmable logic controller configured to execute computer executable instructions, and it can be realized in software and/or hardware in the typical fashion.

During operation of the processing unit, a flag can be raised if the temperature into the future is predicted to rise above a critical temperature and remedial action, such as reducing power, or even switching off the device can be undertaken.

In an example, the processing unit is configured to select the correlation from a plurality of correlations of different operational scenarios for the device. Each of the plurality of correlations is a correlation of a plurality of temperature magnitudes and a plurality of rate of change of temperatures at the sensor location with a plurality of hotspot temperatures at the location.

Thus, a series of correlations of temperatures and rate and change of temperatures can be correlated with a temperature at a hotspot location, undertaken by measurement or simulation. It can then have been established by measurement or simulation that under steady state conditions, in other words if nothing changes, that the temperature at the hot spot will rise above a critical temperature and it can be determined that the device has a fault that is leading to the heating. Then remedial action can be taken well before the overheating, that would inevitably happen if no action were to be taken, actually occurs. Each of these correlations can apply for example to different power operating situations, with and without different faults, in order that it can be established if overheating will occur due to a fault or if everything is in order and no overheating will occur.

In an example, each of the plurality of correlations is determined through experiments or through simulations.

In an example, the system comprises at least one further sensor configured to measure current and/or power. the current and/or the power comprises a current through the device and/or a power drawn by the device at a time of acquisition of the first temperature data and/or at a time of acquisition of the second temperature data. The prediction of the temperature at the location comprises utilization of the current and/or power.

Thus, the accuracy of the fault determination through a predicted temperature is increased by taking into account other relevant operational data for the device.

In an example, selection of the correlation comprises utilization of the current and/or power.

Thus, the accuracy of the selecting the correlation is increased by taking into account other relevant operational data for the device.

In an example, the temperature data comprises third temperature data and fourth temperature data acquired a second time period after the third temperature data, and where the second time period is over a different time period to the first time period. The processing unit is configured to determine a second temperature magnitude comprising utilization of the third temperature data and/or the fourth temperature data. The processing unit is configured to determine a second rate of change of temperature comprising utilization of the third temperature data and the fourth temperature data and the second time period. The prediction of the temperature at the location comprises utilization of: the second temperature magnitude; and the second rate of change of temperature.

In other words, in effect a "single" data point of temperature at a location and a rate of change of temperature at that location can be utilized to determine temperatures into the future at that location or at other locations, but the accuracy of the prediction into the future can be improved by taking into a temporal profile of the temperatures and rate of change of temperatures at that location.

In an example, selection of the correlation comprises utilization of the second temperature magnitude, and the second rate of change of temperature.

In other words, in effect a "single" data point of temperature at a location and a rate of change of temperature at that location can be utilized to select the correlation relating to what is occurring in the device to predict a future temperature, but the accuracy of the selection can be improved by taking into a temporal profile of the temperatures and rate of change of temperatures at that location.

In an example, the location is a different location to the sensor location.

In an example, the location is thermally connected to the sensor location.

In an example, the location is the sensor location.

In an example, the sensor is an infrared camera or thermocouple sensor or surface acoustic wave sensor or RFID temperature sensor.

In an example, the device comprises a part of a medium voltage switchgear or a motor.

In a second aspect, there is provided a fault detection method, comprising: acquiring with a sensor temperature data at a sensor location of a device, wherein the temperature data comprises first temperature data and second temperature data acquired a first time period after the first temperature data; determining by a processing unit a temperature magnitude comprising utilizing the first temperature data and/or the second temperature data; determining by the processing unit a rate of change of temperature comprising utilizing the first temperature data and the second temperature data and the first time period; predicting by the processing unit a temperature at a location of the device comprising utilizing the temperature magnitude, the rate of change of temperature, and a correlation, wherein the correlation is a correlation of a plurality of temperature magnitudes and a plurality of rate of change of temperatures at the sensor location with a plurality of hotspot temperatures at the location; determining by the processing unit if the device has a fault comprising utilization of the predicted temperature; and outputting by an output unit an indication that the device has a fault.

In an example, the method comprises selecting by the processing unit the correlation from a plurality of correlations of different operational scenarios for the device, and where each of the plurality of correlations is a correlation of a plurality of temperature magnitudes and a plurality of rate of change of temperatures at the sensor location with a plurality of hotspot temperatures at the location.

The above aspects and examples will become apparent from and be elucidated with reference to the embodiments described hereinafter.

FIGS. 1-2 relate to a fault detection system and a fault detection method.

In an example, the fault detection system comprises a sensor, a processing unit, and an output unit. The sensor is configured to acquire temperature data at a sensor location of a device. The temperature data comprises first temperature data and second temperature data acquired a first time period after the first temperature data. The processing unit is configured to determine a temperature magnitude comprising utilization of the first temperature data. Alternatively or additionally the processing unit is configured to determine a temperature magnitude comprising utilization of the second temperature data. The processing unit is configured to determine a rate of change of temperature comprising utilization of the first temperature data and the second temperature data and the first time period. The processing unit is configured to predict a temperature at a location of the device comprising utilization of the temperature magnitude and the rate of change of temperature and a correlation. The correlation is a correlation between (or of):

- a plurality of temperature magnitudes and a plurality of rate of change of temperatures at the sensor location, and (or with)
- a plurality of hotspot temperatures at the location.

The processing unit is configured to determine if the device has a fault comprising utilization of the predicted temperature. The output unit is configured to output an indication that the device has a fault.

It is to be noted that the device can be equipped with many temperature sensors at the thermally critical positions. A problem/fault can then be signalized if any of these sensors provides data that enables it to be determined that a temperature will develop that is too close to a critical temperature.

In an example, the temperature magnitude is the first temperature.

In an example, the temperature magnitude is the second temperature.

In an example, the temperature magnitude is an average of the first temperature and the second temperature.

According to an example, the processing unit is configured to determine if the device has a fault comprising a determination that the predicted temperature exceeds a threshold temperature.

According to an example, the processing unit is configured to select the correlation from a plurality of correlations of different operational scenarios for the device. Each of the plurality of correlations is a correlation between (or of)

- a plurality of temperature magnitudes and a plurality of rate of change of temperatures at the sensor location and (or with)
- a plurality of hotspot temperatures at the location.

According to an example, each of the plurality of correlations is determined through experiments or through simulations.

According to an example, the system comprises at least one further sensor configured to measure current. The current comprises a current through the device at a time of acquisition of the first temperature data. Alternatively or additionally the current comprises a current through the device at a time of acquisition of the second temperature data. The prediction of the temperature at the location comprises utilization of the current.

According to an example, the system comprises at least one further sensor configured to measure power. The power comprises a power drawn by the device at a time of acquisition of the first temperature data. Alternatively or additionally the power comprises a power drawn by the device at a time of acquisition of the second temperature data. The prediction of the temperature at the location comprises utilization of the power.

According to an example, the system comprises at least one further sensor configured to measure current and power. The current and the power comprises a current through the device and a power drawn by the device at a time of acquisition of the first temperature data.

Alternatively or additionally the current and the power comprises a current through the device and a power drawn by the device at a time of acquisition of the second temperature data. The prediction of the temperature at the location comprises utilization of the current and the power.

According to an example, selection of the correlation comprises utilization of the current and/or power.

According to an example, the temperature data comprises third temperature data and fourth temperature data acquired a second time period after the third temperature data. The second time period is over a different time period to the first time period. The processing unit is configured to determine a second temperature magnitude comprising utilization of the third temperature data and/or the fourth temperature data. The processing unit is configured to determine a second rate of change of temperature comprising utilization of the third temperature data and the fourth temperature data and the second time period. The prediction of the temperature at the location comprises utilization of the second temperature magnitude and the second rate of change of temperature.

In an example, the second temperature magnitude is the third temperature.

In an example, the second temperature magnitude is the fourth temperature.

In an example, the second temperature magnitude is an average of the third temperature and the fourth temperature.

In an example, the third temperature was acquired at the time of acquisition of the second temperature and is equal to the second temperature. Thus, the second time period is immediately after the first time period.

In an example, the fourth temperature was acquired at the time of acquisition of the first temperature and is equal to the first temperature. Thus, the second time period is immediately before the first time period.

In an example, the second time period is temporally spaced before the first time period.

In an example, the second time period is temporally spaced after the first time period.

In an example, the third temperature was not acquired at the time of acquisition of the second temperature.

In an example, the fourth temperature was not acquired at the time of acquisition of the first temperature.

According to an example, selection of the correlation comprises utilization of the second temperature magnitude, and the second rate of change of temperature.

According to an example, the location is a different location to the sensor location.

According to an example, the location is thermally connected to the sensor location.

According to an example, the location is the sensor location.

According to an example, the sensor is an infrared camera or thermocouple sensor or surface acoustic wave sensor or RFID temperature sensor.

According to an example, the device comprises a part of a medium voltage switchgear or a motor.

In an example, a fault detection method comprises:
  acquiring with a sensor temperature data at a sensor location of a device, and where the temperature data comprises first temperature data and second temperature data acquired a first time period after the first temperature data;

determining by a processing unit a temperature magnitude comprising utilizing the first temperature data and/or the second temperature data;

determining by the processing unit a rate of change of temperature comprising utilizing the first temperature data and the second temperature data and the first time period;

predicting by the processing unit a temperature at a location of the device comprising utilizing the temperature magnitude, the rate of change of temperature, and a correlation, wherein the correlation is a correlation of a plurality of temperature magnitudes and a plurality of rate of change of temperatures at the sensor location with a plurality of hotspot temperatures at the location;

determining by the processing unit if the device has a fault comprising utilization of the predicted temperature; and outputting by an output unit an indication that the device has a fault.

In an example, the processing unit is configured to determine if the device has a fault comprising a determination that the predicted temperature exceeds a threshold temperature.

According to an example, the method comprises selecting by the processing unit the correlation from a plurality of correlations of different operational scenarios for the device. Each of the plurality of correlations is a correlation of a plurality of temperature magnitudes and a plurality of rate of change of temperatures at the sensor location with a plurality of hotspot temperatures at the location.

In an example, each of the plurality of correlations is determined through experiments or through simulations.

In an example, the method comprises measuring by at least one further sensor current, wherein current comprises a current through the device at a time of acquisition of the first temperature data and/or at a time of acquisition of the second temperature data, and wherein predicting the temperature at the location comprises utilizing the current.

In an example, the method comprises measuring by at least one further sensor power, wherein power comprises a power drawn by the device at a time of acquisition of the first temperature data and/or at a time of acquisition of the second temperature data, and wherein predicting the temperature at the location comprises utilizing the power.

In an example, the method comprises measuring by at least one further sensor current and power, wherein current and power comprises a current through the device and a power drawn by the device at a time of acquisition of the first temperature data and/or at a time of acquisition of the second temperature data, and wherein predicting the temperature at the location comprises utilizing the current and the power.

In an example, selection of the correlation comprises utilizing the current and/or power.

In an example, the temperature data comprises third temperature data and fourth temperature data acquired a second time period after the third temperature data. The second time period is over a different time period to the first time period, and the method comprises:

determining by the processing unit a second temperature magnitude comprising utilizing the third temperature data and/or the fourth temperature data, and determining by the processing unit a second rate of change of temperature comprising utilizing the third temperature data and the fourth temperature data and the second time period, and wherein the predicting the temperature at the location comprises utilizing the second temperature magnitude and the second rate of change of temperature.

In an example, selecting the correlation comprises utilizing the second temperature magnitude and the second rate of change of temperature.

In an example, the location is a different location to the sensor location.

In an example, the location is thermally connected to the sensor location.

In an example, the location is the sensor location.

In an example, the sensor is an infrared camera or thermocouple sensor or surface acoustic wave sensor or RFID temperature sensor.

In an example, the device comprises a part of a medium voltage switchgear or a motor.

The fault detection system and the fault detection method are described in specific further detail with respect to monitoring a medium voltage switchgear with infrared camera sensors, but other sensors can be utilized and other devices can be monitored with infrared cameras and with these other sensors.

As discussed above, a prediction to the future, or a conclusion on the temperature at the hotspot that is spatially separated from the measurement position, cannot be done with the temperature alone.

The inventors therefore realised that a new technology was required. In this new technology, the temperature T is measured at an accessible point by a sensor, e.g. an infrared camera or other sensing methods like SAW, RFID. The temporal derivative dT/dt of this temperature i.e. the temperature rise rate is calculated by using former of these measurements. If T and dt/dt are high, it has been established that then the device will exceed a critical temperature at the hottest spot of the device. This overheating can however be avoided by reducing the power that heats up the device, when it has been determined that overheating will occur. The position of the hotspot and the position of the temperature measurements do not have to be the same, if the thermal connection between these two points is good. An important element is the correlation: here dangerous pairs of T and dT/dt that lead to overheating are determined in advance, by measurements or simulations.

In other words, the inventors realised that to determine temperatures into the future the correlation between the measured temperature by the sensor at the moment of the measurement and the future temperature at the hotspot position is important to overcome the problem. Once this correlation is known, it is possible to predict the future hotspot temperature from the online (live) temperature-measurement at the sensor position and its temporal derivative. It is to be noted that the correlation can be determined by prior simulations or by prior experiments.

FIG. 1 shows a fault detection system, also termed a thermal monitoring system, for a MV switchgear. The new thermal classification method is described for the example of an IR-camera based monitoring system of a MV switchgear. It is however clear, that the new monitoring method can also be applied to other devices, e.g. motors, with other types of temperature sensor, e.g. PT100 temperature sensors.

The monitoring system includes at least the following elements:

1. A temperature measurement by a sensor (here IR cameras)

2. A calculator unit that computes the temporal derivative of the measured temperature, i.e. the temperature rise rate.
3. Before installation of the monitoring system in the device (here MV Switchgear): a series of simulations or measurements of the temperature T and the temperature rise rate dT/dt that determines the correlation of T and dT/dt with the temperature at the hotspot T_HS for different thermal situations.
4. After installation of the monitoring system in the device: an algorithm that classifies the online temperature measurement by comparing T and dT/dt with T_HS according to the previously determined correlation.

The pictures of the IR-camera comprise an array of temperatures that corresponds to the number of pixels of the optics of the IR-camera.

FIG. 2 plots the two features T and dT/dt for the hottest pixel only. In a particular scenario if a temperature of 45 C is determined with a rate of change of temperature of 1.1 then it has been determined that under steady state conditions, with nothing else happening, the temperature will not develop into a critical temperature. However, if a temperature of 65 C has been measure with a rate of change of temperature of 1.75, even though the temperature at the moment is not critical, it has been established that under steady state conditions with no change, the temperature at this location will develop into a critical temperature and remedial action should be taken before that critical temperature develops. The different lines are shown in FIG. 2 to enable the different correlations for different scenarios to be viewed more easily. Thus in FIG. 2 for each correlation centred around a line the temperature and its rise rate in the hottest pixel of the IR camera is shown, where different lines represent several scenarios. For each scenario at the lower temperature range a developed temperature of a hotspot T_HS will be uncritical. However, at the higher temperature range for each correlation the hotspot temperature T_HS will develop to a temperature above threshold and overheating will occur, and mitigating actions need to be taken to stop this happening. In the centre temperature section the hot spot temperature T_HS will develop to a temperature that is close to the threshold and an appropriate warning can be issued to more closely monitor the situation for example, or take mitigating actions.

Thus, it is enabled to distinguish between a dangerous situation into the future (here to a steady state) with a hotspot temperature T_HS above a threshold from uncritical situations. It is to be noted that the data in FIG. 2 has been generated by simulations but it has been established that the data can also generated by experiments.

As detailed above, dangerous cases and uncritical cases occupy distinct regions in this so-called 2-Feature-Graph-(2FG). An algorithm to classify a new IR picture in a specific example can then works as follows:
1. Determine T and dT/dt in the new IR picture (maximum temperature and its rise rate)
2. Check whether it is
   a. in a region that will lead to a critical temperature
   b. in a region that will lead to a temperature close to the critical temperature
   c. in a region that will lead to a temperature that will remain uncritical
3. If it is determined that it is in the region 2a it has been determined that the switchgear will be overheated at the hotspot (here in a future steady state), and therefore it can be determined to reduce the power and if necessary carry out an inspection of joints/mountings/fixings etc.

As mentioned above, this classification method can be generalized to different types of devices, and different types of temperature sensors.

The properties of the 2FG graph is very well understood by the inventors, in for example the case of the IR-monitoring system for the MV switchgear. It has been demonstrated for example cases that this classification method is to some extent:
- Independent of the load history of the switchgear
- Independent of the switchgear type
- Insensitive against problems with pictures like noise, misalignments, distortion
- A current sensor is not needed for the classification
- Very high quality/accuracy of the predictions has been confirmed, where in tests more than 98% of all cases have been classified correctly.

It is to be noted that although other sensors and/or temporal history of T and dT/dt are not required, the combination of T and dT/dt with other measured features of the device such as current/voltage/power and a temporal history of T and dT/dt can increase the accuracy of the classification.

In summary, the incorporation of the rise rate of the temperature enables the early prediction of a possible future overheating when it is combined with the temperature itself, as well as with the correlation of the measured T and dT/dt at the sensors position with the hotspot temperature.

This provides for:
- Earlier detection/prediction of future overheating, i.e. more time to take counter measures.
- The temperature sensors do not need to be installed at the hotspot position. It is enough to install them at positions that have a good thermal connection to the hotspot.
- Better reliability: the combination of the temperature and the temperature-rise-rate yields higher accuracy of the thermal classification.
- It is not necessary to know the thermal history of the device, or the power input in order to predict future overheating.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fault detection system, comprising:
   a sensor;
   a processing unit; and
   an output unit;
   wherein the sensor is configured to acquire temperature data at a sensor location of a device, wherein the temperature data comprises first temperature data and second temperature data acquired a first time period after the first temperature data;
   wherein the processing unit is configured to determine a temperature magnitude comprising utilization of the first temperature data and/or the second temperature data;
   wherein the processing unit is configured to determine a rate of change of temperature comprising utilization of the first temperature data and the second temperature data and the first time period;
   wherein the processing unit is configured to predict a temperature at a location of the device comprising utilization of the temperature magnitude, the rate of change of temperature, and a correlation, wherein the correlation is a correlation of a plurality of temperature magnitudes and a plurality of rate of change of temperatures at the sensor location with a plurality of hotspot temperatures at the location;
   wherein the processing unit is configured to determine if the device has a fault comprising utilization of the predicted temperature; and
   wherein the output unit is configured to output an indication that the device has a fault.

2. The fault detection system according to claim 1, wherein the processing unit is configured to determine whether the device has a fault comprising a determination that the predicted temperature exceeds a threshold temperature.

3. The fault detection system according to claim 1, wherein the processing unit is configured to select the correlation from a plurality of correlations of different operational scenarios for the device, wherein each of the plurality of correlations is a correlation of a plurality of temperature magnitudes and a plurality of rate of change of temperatures at the sensor location with a plurality of hotspot temperatures at the location.

4. The fault detection system according to claim 3, wherein each of the plurality of correlations is determined through experiments or through simulations.

5. The fault detection system according to claim 1, further comprising at least one further sensor configured to measure current and/or power, wherein current and/or power comprises a current through the device and/or a power drawn by the device at a time of acquisition of the first temperature data and/or at a time of acquisition of the second temperature data, and wherein the prediction of the temperature at the location comprises utilization of the current and/or power.

6. The fault detection system according to claim 5, wherein selection of the correlation comprises utilization of the current and/or power.

7. The fault detection system according to claim 1, wherein the temperature data comprises third temperature data and fourth temperature data acquired a second time period after the third temperature data, wherein the second time period is over a different time period to the first time period, wherein the processing unit is configured to determine a second temperature magnitude comprising utilization of the third temperature data and/or the fourth temperature data, wherein the processing unit is configured to determine a second rate of change of temperature comprising utilization of the third temperature data and the fourth temperature data and the second time period, and wherein prediction of the temperature at the location comprises utilization of the second temperature magnitude, and the second rate of change of temperature.

8. The fault detection system according to claim 7, wherein selection of the correlation comprises utilization of the second temperature magnitude, and the second rate of change of temperature.

9. The fault detection system according to claim 1, wherein the location is a different location to the sensor location.

10. The fault detection system according to claim 9, wherein the location is thermally connected to the sensor location.

11. The fault detection system according to claim 1, wherein the location is the sensor location.

12. The fault detection system according to claim 1, wherein the sensor is an infrared camera or thermocouple sensor or surface acoustic wave sensor or RFID temperature sensor.

13. The fault detection system according to claim 1, wherein the device comprises a part of a medium voltage switchgear or a motor.

14. A fault detection method, comprising:
   acquiring with a sensor temperature data at a sensor location of a device, wherein the temperature data comprises first temperature data and second temperature data acquired a first time period after the first temperature data;
   determining by a processing unit a temperature magnitude comprising utilizing the first temperature data and/or the second temperature data;
   determining by the processing unit a rate of change of temperature comprising utilizing the first temperature data and the second temperature data and the first time period;
   predicting by the processing unit a temperature at a location of the device comprising utilizing the temperature magnitude, the rate of change of temperature, and a correlation, wherein the correlation is a correlation of a plurality of temperature magnitudes and a plurality of rate of change of temperatures at the sensor location with a plurality of hotspot temperatures at the location;

determining by the processing unit if the device has a fault comprising utilization of the predicted temperature; and outputting by an output unit an indication that the device has a fault.

15. The fault detection method according to claim 14, wherein the method comprises selecting by the processing unit the correlation from a plurality of correlations of different operational scenarios for the device, wherein each of the plurality of correlations is a correlation of a plurality of temperature magnitudes and a plurality of rate of change of temperatures at the sensor location with a plurality of hotspot temperatures at the location.

* * * * *